March 14, 1944.  L. A. BIXBY  2,344,388
VEHICLE DRIVING MECHANISM
Filed March 7, 1940   6 Sheets-Sheet 1
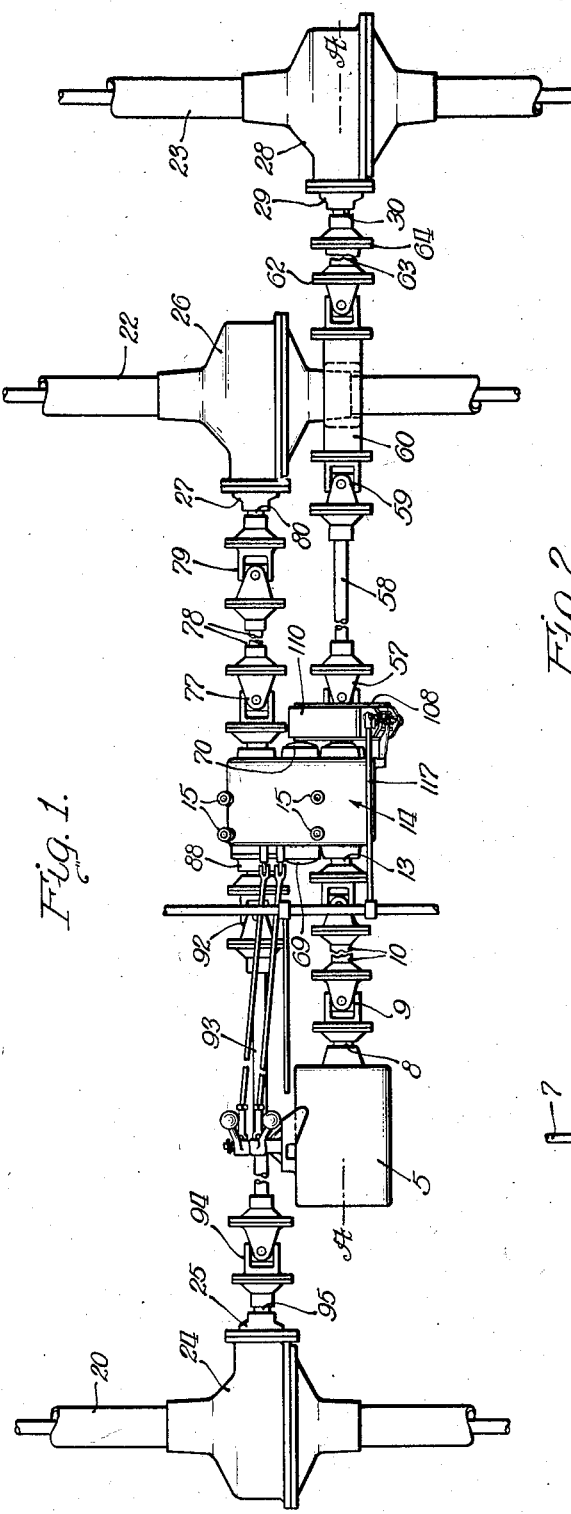
INVENTOR.
Leo A. Bixby
BY Walter E. Schirmer
ATTORNEY.

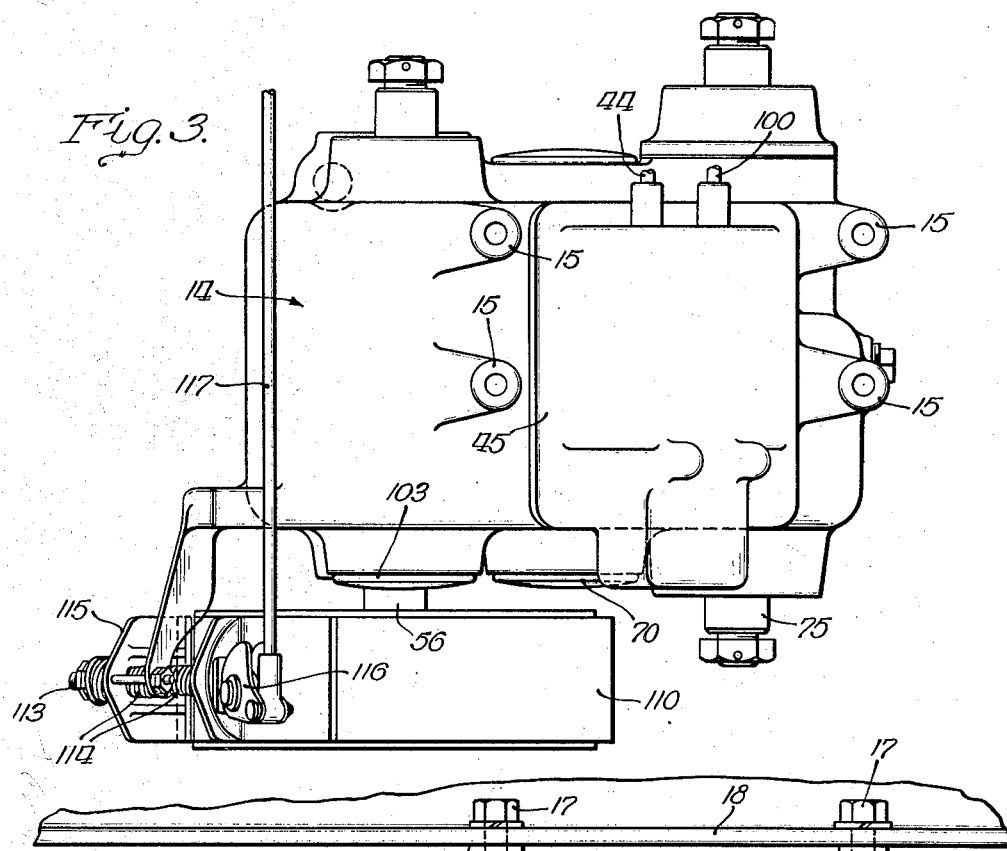

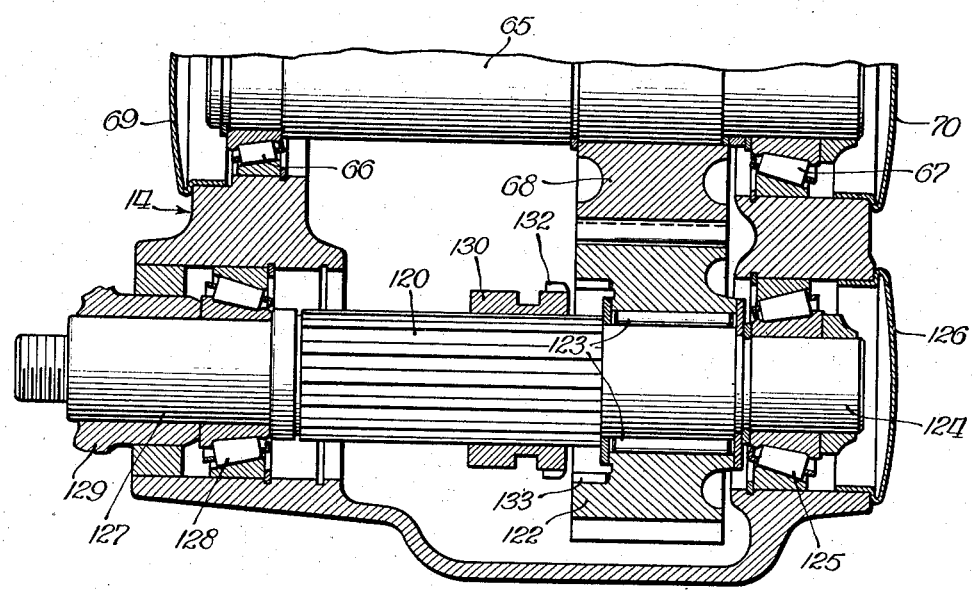

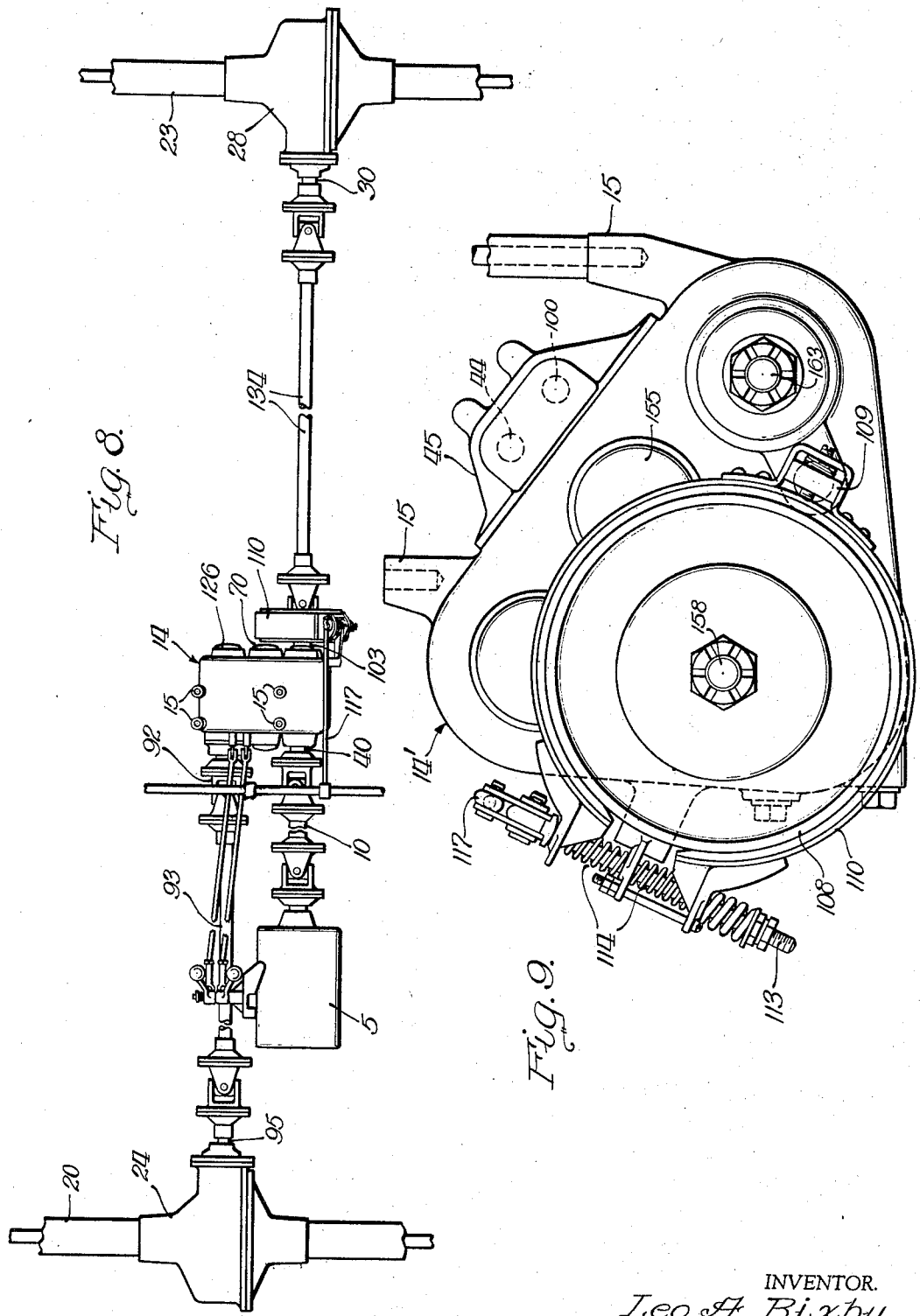

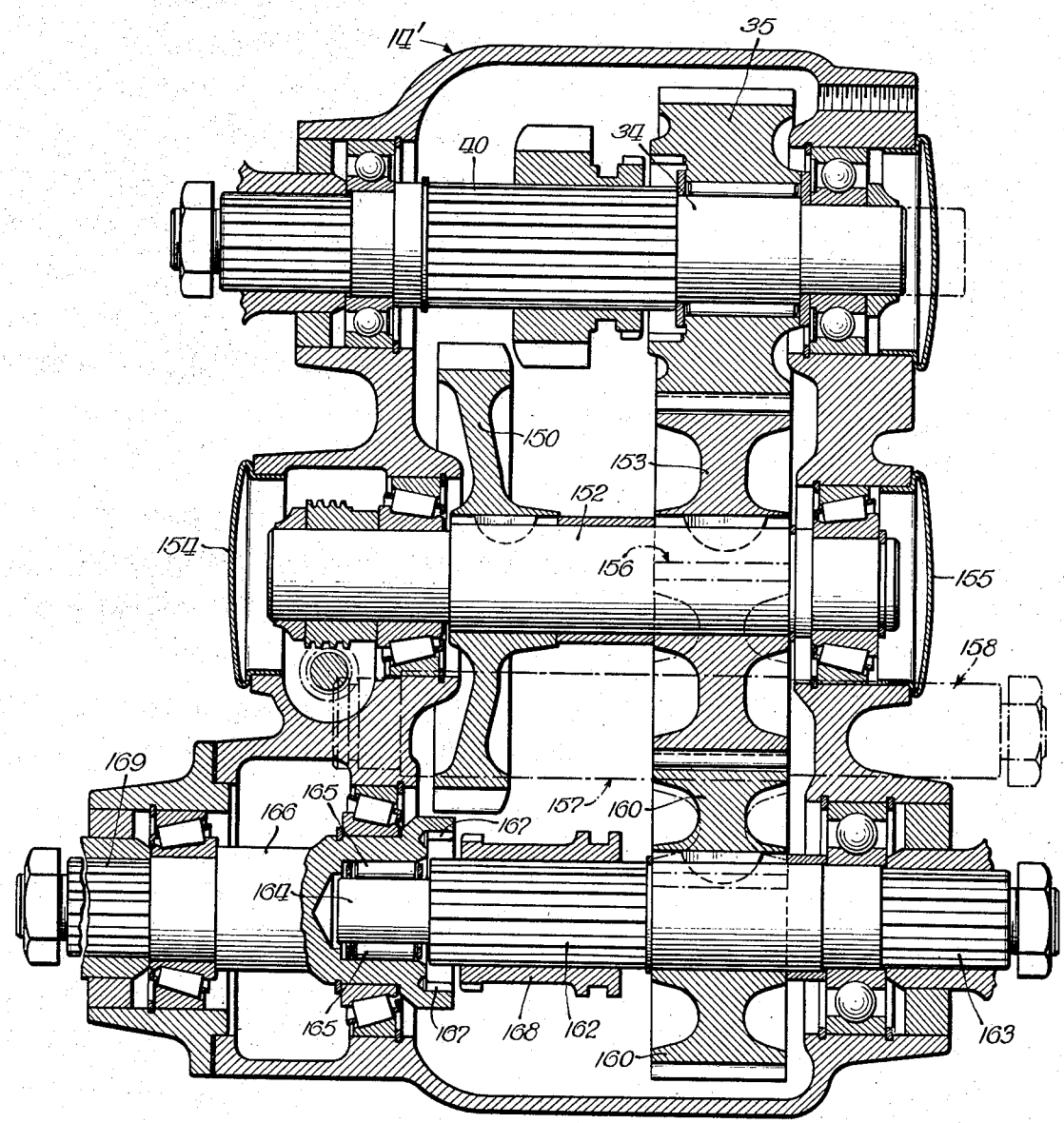

Patented Mar. 14, 1944

2,344,388

UNITED STATES PATENT OFFICE 2,344,388

VEHICLE DRIVING MECHANISM

Leo A. Bixby, Berrien Springs, Mich., assignor to Clark Equipment Company, Buchanan, Mich., a corporation of Michigan Application March 7, 1940, Serial No. 322,686

20 Claims. (Cl. 180—24)

This invention relates to vehicles, and more particularly is concerned with the driving arrangements in vehicles for driving both front and rear axles to provide a four-wheel drive or, when an auxiliary rear axle is provided, for driving all three axles to provide a six-wheel drive for the vehicle.

Broadly contemplated, the present invention pertains particularly to the driving arrangements between the conventional transmission of the vehicle and the axles, and includes the provision of an auxiliary transmission or transfer gearing whereby the torque of the engine can be split or divided for transmission to the various axles.

In a preferred form of the present invention the auxiliary transmission or transfer gearing is so arranged that its power input shaft is connected to the output shaft of the conventional transmission. This input shaft is disposed substantially in the longitudinal center plane of the vehicle, and the output shaft in the transfer gearing for connection to the rear axle is disposed therebelow and in substantially the same plane. This allows dropping of the propeller shaft between the transfer gearing and the rear axle, thereby materially reducing the angularity in the universal joint in the ends of the propeller shaft and also eliminating the necessity for an offset differential in the rear axle housing.

The transfer gearing is so arranged that it has a second laterally disposed output shaft which can be connected at its forward end to the propeller shaft leading to the front driving axle and so arranged as to be spaced laterally of the engine and transmission so as not to interfere therewith and allow the engine to overhang the front axle, the differential housing of the front axle being laterally offset for this purpose. A second direct output is disposed in axial alinement with the front axle output shaft, and can be used for connection to an auxiliary rear axle when a six-wheel drive is desired.

The present invention has for one of its primary objects the provision of transfer gearing in which the output shaft for the rear axle is disposed substantially in the longitudinal center plane of the vehicle to eliminate offsetting in the rear axle housing and to provide for reduced angularity of the rear propeller shaft. The transfer gearing is designed in such manner that is can be employed to replace previous types of transfer gearing, and can be supported from the central cross member of the vehicle chassis whereby the same interconnecting shaft between this transfer gearing and the conventional transmission can be used that is now used with transfer gearing of the type now on the market. This allows replacement of existing structures by the present construction without requiring any chassis changes. As a result, the present invention is well adapted for use for military purposes where it may be desired to replace damaged parts of a multi-wheel drive vehicle with the present construction.

The present invention contemplates the use of suitable control mechanism located adjacent the transmission whereby the drive to the front axle can be disconnected independently of the drive to the rear axle and, also, whereby the driving ratio between the transmission and the axles can be selectively changed through suitable change speed gearing in the transfer case.

Still another feature of the present invention is the provision of braking means on the rear axle output shaft which is capable of controlling all of the output shafts of the transfer case so that a single brake mechanism can be employed for this purpose.

The present invention can also be utilized for installation in vehicles designed with both front and rear axles having laterally offset differential housings, in which case the power output is taken from shafts disposed in laterally offset and vertically lowered position relative to the input shaft of the transfer case.

Still another feature of the present invention is the provision of transfer gearing so designed that the input shaft, the rear axle output shaft, and the front axle output shaft are all rotating in the same direction, which may be found desirable for some purposes.

Another advantage secured by the present invention resides in the provision of power takeoff means, which can be connected to any of the power output shafts of the transfer gearing not employed in driving an axle. Further, if all such power output shafts are utilized for axle drives, the power takeoff can be connected directly to the free end of the input shaft, in which case the power takeoff is operable independently of movement of the vehicle, and can consequently receive the full torque of the motor when the vehicle is standing still.

A further advantage of the present invention resides in using a one piece housing for the transfer case, in which the gears may be inserted through the control plate opening which is later closed by the control plate carrying the shift rails and forks for controlling the gearing in the case. By having an integral housing of this type, the bores for the shafts and bearings can all be drilled at one setting of the housing, and are thereby positively and accurately located so as to eliminate possibilities of misalinement which might arise if an end plate were bolted to the housing and had to be dowelled and piloted thereon to bring the opposite end bores for the shifting into register.

Other objects and advantages of the present invention will become more apparent to those skilled in the art from the following detailed description which, taken in conjunction with the accompanying drawings, will disclose the details of construction and operation of preferred forms of the present invention.

In the drawings:

Figure 1 is a plan view, somewhat diagrammatic in form, of a vehicle axle and drive assembly embodying the present invention;

Figure 2 is an elevational view of the construction shown in Figure 1;

Figure 3 is a top plan view of the transfer case;

Figure 4 is a rear end elevational view thereof;

Figure 6 is a detailed sectional view of a modified construction employed when a four-wheel drive is desired;

Figure 7 is a view corresponding to Figure 6 of a construction to be employed when two rear axles are provided, both of which drive, and no drive is provided for the front axle;

Figure 8 is a view corresponding to Figure 1 showing the drive connections for a four-wheel drive vehicle;

Figure 9 is a rear elevational view corresponding to Figure 4 of a modified form of transfer case; and Figure 10 is a diagrammatic view showing the gearing arrangement within the transfer case of Figure 9.

Figure 5:
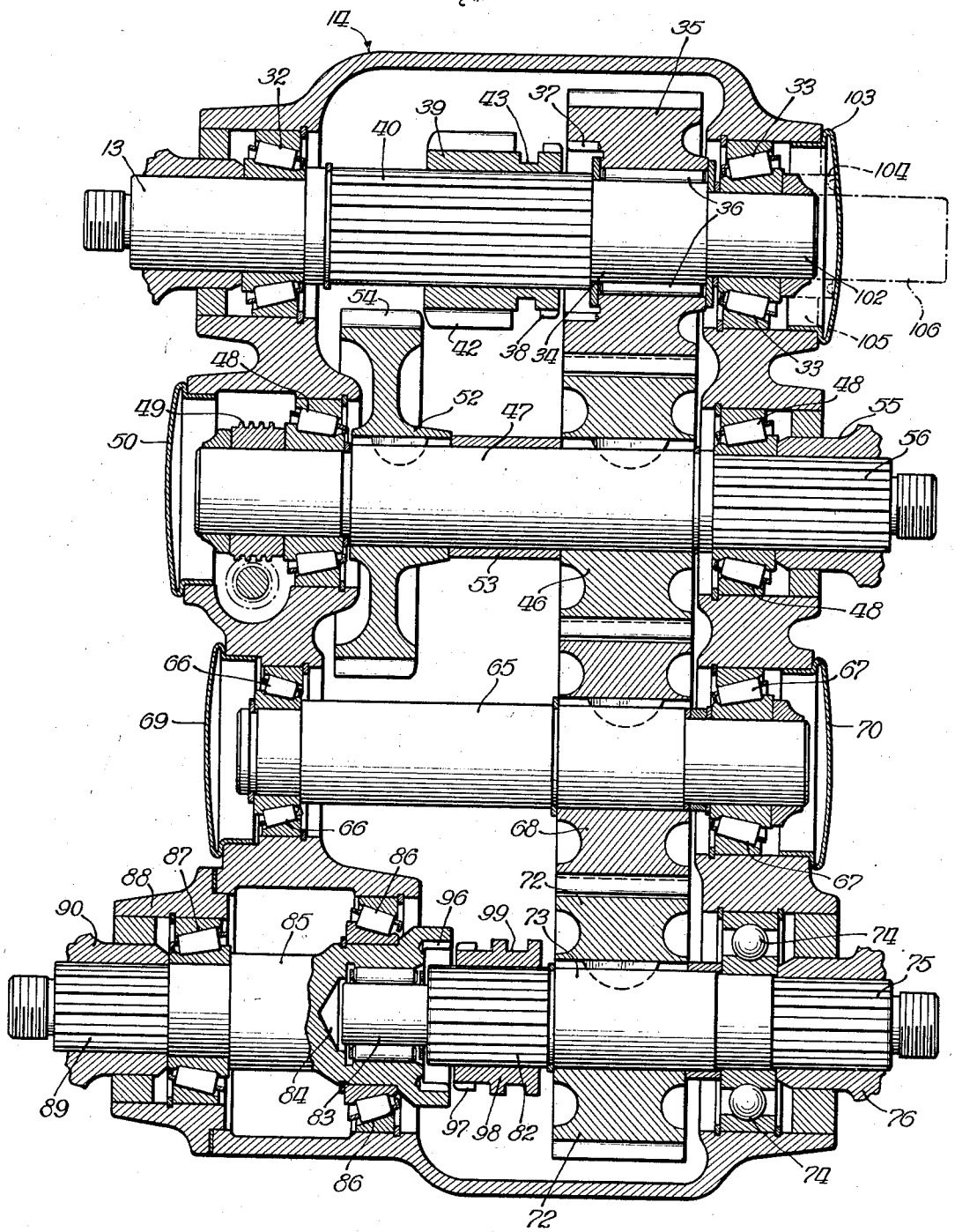
Figure 5 is a transverse sectional view through the transmission case taken substantially on line 5—5 of Figure 4.

Referring now in detail to the drawings, the driving connections shown in Figure 1 relate to a vehicle having two rear driving axles and a front driving axle, or what is commonly termed a "six-wheel drive construction."

In this form of drive, the conventional transmission 5 is provided which is connected in any suitable manner (not shown) to a power plant such as an internal combustion engine, Diesel engine, or the like, and which is provided with the pedestal top member 6 carrying the usual gear shift lever 7. The output shaft of the transmission is indicated at 8 and is provided with a universal joint 9, which, through the torque transmitting shaft 10, is connected to a second universal joint 12 leading to the input shaft 13 of the transfer case indicated generally at 14. It will be noted that the transmission, the shaft 10, and the input shaft 13 are all disposed in the longitudinal center plane of the vehicle indicated by the line A.

The transfer case 14 is provided with a plurality of bosses 15 which, through suitable cap bolts 17, are connected to the cross member 18 of the vehicle chassis, there being suitable spacing means 19 provided for the lowermost set of bosses.

The vehicle is provided with a front axle assembly 20 and two rear axle assemblies 22 and 23, respectively, the axle assembly 23 corresponding to the conventional rear axle commonly employed in motor vehicles of this type. The axle assembly 20 is provided with a differential housing 24 which is laterally offset to one side of the longitudinal center of the chassis, and which is provided with the nose portion 25 secured thereto and containing a pinion shaft adapted to drive the differential ring gear enclosed within the housing 24. A similar laterally offset differential housing 26 is provided for the axle assembly 22, and is provided with a forwardly projecting nose portion 27 receiving a pinion shaft which drives the differential ring gear within the housing 26. The rear axle assembly 23 is provided with a differential housing 28 which is disposed substantially in the longitudinal central plane of the vehicle, and is provided with a nose portion 29 receiving the pinion shaft 30 for driving the differential ring gear within the housing 28.

Each of the axle assemblies 20, 22 and 23 comprise a differential mechanism connected to a pair of axle shafts enclosed within the arms of the housing and connected at their outer ends to suitable driving wheels, the front axle assembly including universally driven spindle or stub shafts whereby steering movement of the front axle wheels is produced. The details of such constructions form no part of the present invention and are therefore not illustrated.

Considering now in detail Figures 3 to 5, inclusive, the transfer case 14 is of generally triangular shape and the input shaft 13 thereof is journalled in the upper portion of the housing adjacent the bosses 15 by means of suitable bearing assemblies 32 and 33, this shaft being of one piece construction and having the reduced shoulder portion 34 upon which is rotatably journalled the gear 35 by means of the bearing 36. The gear 35 is restrained against axial movement, and is provided with the overhanging internal clutch tooth portion 37 adapted to be engaged by the clutch tooth portion 38 of the sliding gear 39, non-rotatably mounted for axial sliding movement on the splined portion 40 of the shaft 13. The gear 39 is provided with the external gear tooth portion 42 separated from the clutch tooth portion 38 by the annular groove 43 adapted to receive a shifting yoke carried by the shift rail 44 journalled in the shift control cap 45 mounted on the inclined wall of the housing.

In the position shown in Figure 5, the gear 39 is in a neutral position whereby no power is transmitted from the shaft 13 to any of the other shafts in the transfer case. It will be noted that the gear 35 is in constant mesh with a gear 46 secured to the shaft 47 mounted by means of the bearing assemblies 48 in the housing and terminating at its forward end in a speedometer gear 49. The housing is provided with an opening receiving the shaft 47, and at its forward end, this opening is closed by means of the closure plug 50.

Also non-rotatably mounted upon the shaft 47 is a second gear 52 spaced from the gear 46 by means of the spacing sleeve 53 and having the external gear tooth portion 54 adapted to be engaged by the toothed portion 42 of the gear 39 when the gear 39 is shifted axially to the left, as shown in Figure 5. The rear end of the shaft 47 extends outwardly of the transfer gear case 14, and is adapted to receive the companion flange 55 on the reduced splined portion 56 thereof. Companion flange 55 forms one portion of the universal joint assembly 57 which is connected through the propeller shaft 58 to a second universal joint 59 connected through a power transmitting shaft enclosed within the housing or sleeve 60 mounted in any suitable manner upon the axle assembly 22 and through the universal joints 62 and propeller shaft 63 to the pinion shaft 30 of the differential assembly 28 carried by the rear axle housing 23. It will therefore be apparent that torque transmitted to the shaft 47 from the shaft 40, either through clutching of the shaft 40 to the gear 35 by means of the clutch 38 when the gear 39 is shifted to the right, or through the gear 39 and gear 52, will be transmitted through the shafts 58 and 63 to the rear axle assembly for driving the same.

Disposed in a laterally offset position from the shaft 47 in the transfer case 14 and slightly below the horizontal plane through the shaft 47 is a countershaft 65 mounted at its opposite ends in the bearing assemblies 66 and 67, having intermediate its ends the gear 68, which may be keyed to the shaft and which is in constant meshing engagement with the gear 46 whereby it will rotate at all times that the gear 46 or the shaft 47 is being driven.

The transfer case is provided with bores at opposite sides thereof for receiving the bearing assemblies 66 and 67, and these bores are suitably closed by caps 69 and 70 as no power is taken directly from the shaft 65.

The gear 68 acts as an intermediate or idler gear between the gear 46 on the shaft 47 of the gear 72 on the shaft 73.

The shaft 73 is supported adjacent the gear 72 by means of the ball bearing assembly 74 which is located in a bore in the rear side of the transfer case and through which the splined end 75 of the shaft extends for receiving the companion flange 76 of a universal joint assembly 77 which, through the propeller shaft 78 and second universal joint assembly 79, is adapted to drive the pinion shaft 80 extending into the differential housing of the axle assembly 22. It will be apparent that the shafts 47 and 73 both rotate in the same direction, and consequently the differential mechanisms 26 and 28 may be identical in form with one laterally offset relative to the other.

At its forward end the shaft 73 is provided with the splined portion 82 and with the reduced stud portion 83 piloted in the recessed end 84 of a stub shaft 85 journalled by means of the bearings 86 and 87 in axial alinement with the shaft 73.

The bearing assembly 87 is carried by a bearing cap 88 secured to the front wall of the transfer case 14, and the stub shaft 85 has the splined forwardly extending portion 89 to which is secured the companion flange 90 of a universal joint 92 which transmits drive from the shaft 85 forwardly through the propeller shaft 93 and the universal joint 94 to the pinion shaft 95 for the front axle assembly 20.

The inner end of the stub shaft 85 is expanded to provide an internal clutch tooth portion 96 adapted to be engaged by the clutch teeth 97 of a clutch sleeve 98 carried upon the splined portion 82 of the shaft 73 and provided with the shifter collar 99 adapted to be engaged by a shift yoke carried by the shifter rail 100 extending into and journalled for axial movement in the control cap 45 secured to the top surface of the transfer case 14.

In operation of the transfer gearing as thus described, torque may be transmitted to the front axle when the clutch sleeve 98 is shifted to the left to clutch the shafts 85 and 73 together, whereby torque is transmitted to both the front axle assembly through the jack shaft 85 and to the forward axle assembly 22 at the rear of the vehicle through the shaft 73. It will be noted that the direction of rotation of the shaft 85, as well as the shaft 73, corresponds to that of the shaft 47 and therefore, all three of these shafts rotate in the same direction, which appears desirable in commercial practice. It will also be apparent that the speed of rotation of all three of these shafts is controlled through the change-speed gearing selected by means of the shifting of the gear 39 on the shaft 40 from a position engaging the gear 52 into a position in which the gear 35 is clutched therethrough to the shaft 40. The gears 46, 68 and 72 are all of the same size so that the shaft 47 and the shafts 73 and 85 will rotate at a common speed whereby uniform driving of all of the axle assemblies is effected. The change-speed selection provided by the gear 39 is independent of the operation of the clutch 98 so that the position of the clutch 98 will determine whether or not the front axle will be driven, but so long as the gear 39 is in one or the other of its operative positions, both of the rear axles will be driven from the shafts 48 and 73. It is thus possible to declutch the front axle without affecting the drive of either of the rear axles.

Referring again to the power input shaft 40 of the transfer gearing, this shaft may be provided with the reduced end portion 102 journalled in the bearings 33 with the bearing recess closed by means of the cap 103. If desired, however, the cap may be removed and suitable spacing means inserted, as indicated in dotted lines at 104 and 105, with the reduced portion 102 of the shaft extended as indicated at 106 for connection to any power take-off mechanism such as a winch, crane, or other power operated means.

Considering now Figures 1 and 2, it will be noted that the output shaft 47 is provided with a brake drum 108 exteriorly of the rear wall of the housing 14, which brake drum is secured to the shaft and rotates conjointly therewith. Anchored to an integral boss 109 on the rear wall of the casing is a brake band 110 which, at its adjacent ends, is provided with lugs 112 engaged by the J-bolt 113 and normally spread apart by means of springs 114 carried by this bolt on opposite sides of the center flange 115 carried by the housing. Suitable cam members 116 connected to the brake rod 117 serve to compress the springs for actuating the brake. This construction may be similar to that disclosed in my copending patent, No. 2,090,100, issued August 17, 1937, and no further description thereof is believed necessary.

Considering now the form of the invention shown in Figures 6 and 8, in which a four-wheel drive is provided, the transmission 5 is identical with that described in Figures 1 and 2, and is connected in the usual manner through the shaft 10 to the input shaft 40 of the transfer case 14. The transfer case is identical with the case shown in Figure 5 with the exception of the shafts 73 and 85 which are removed, and in lieu thereof, there is provided a single shaft 120 carrying the gear 122 rotatably journalled thereon by means of the bearings 123. The shaft is reduced adjacent the gear as indicated at 124 for journalling in the bearings 125 supporting the same in the transfer case, this end of the shaft being closed by the cover cap 126. The shaft 120 extends forwardly and at the reduced portion 127 is journalled on the bearings 128 whereby the shaft is rotatable within the transfer case. Its extending end 127 is splined to receive the companion flange 129 of the universal joint assembly 92 which, through the propeller shaft 93, connects the shaft 120 with the pinion shaft 95 of the front axle differential mechanism in the housing 24. Mounted on the shaft 120 within the transfer case 14 is the clutch sleeve 130 having the clutch teeth 132 thereon adapted to be moved into engagement with the internal clutch teeth 133 formed on the gear 122. The sleeve 130 is splined on the shaft 120 so that when the sleeve is moved into engagement with the gear 122, this gear is locked to drive the shaft 120 from the gear 68. Since the gear 122 is of the same size and number of teeth as the gear 68, it is apparent that the shaft 120 will be driven at the same speed as the shaft 47, and consequently the front axle assembly will be driven at the same speed as the rear axle 23 which is connected to the shaft 47 through the propeller shaft 134.

It will be noted that in this form of the invention the propeller shaft 134 extends substantially in the medial plane of the chassis and is disposed below the horizontal plane through the input shaft 40, whereby the angularity in the joints of the propeller shaft 134 is materially reduced. Thus, a four-wheel drive is provided of simplified construction which retains the rear axle assembly with a centrally located differential and a lowered propeller shaft, all of which can be accommodated by merely substituting the shaft 120 in the transfer case for the shafts 73 and 85. Thus, the transfer case is capable of use either for a six-wheel drive or a four-wheel drive without any change other than the replacement of the one shaft section. The controls are identical with those described in connection with Figures 1, 2 and 5, one of the control rods being used for the change speed gearing on the shaft 40 and the other control rod being used to control the clutch 130 for connecting or disconnecting the front axle drive.

In the embodiment of the invention shown in Figure 7, the transfer case has been modified by the substitution of the shaft 140 for the shaft 120 of Figure 6, or the shafts 73 and 85 of Figure 5. This modification is for use when a tandem rear axle construction is provided, in which both rear axles are drive axles corresponding to the form shown in Figure 1, but there is no provision for driving the front axle assembly. In this form of the invention, the gear 142 carried by the shaft 140 is keyed for conjoint rotation therewith, and is driven from the gear 68 on the countershaft 65. The shaft 140 is journaled in the transfer case by means of the bearings 143 and 144, and at its forward end is enclosed by the cover cap 145. A rearwardly extending portion of the shaft 140 is reduced, as indicated at 146, and is preferably splined to receive a companion flange 147 for connection to a universal joint such as the joint 77 of Figure 1, whereby drive can be transmitted to an axle assembly corresponding to the assembly 22 of Figure 1. The shaft 47 in this form of the invention is still connected to drive the conventional rear axle assembly 23 in the manner heretofore described. Thus, it is believed obvious that the transfer case shown in Figures 3 and 4 can be employed for either a 4 x 4 drive, a 4 x 6 drive, or a 6 x 6 drive merely by modification of the shaft connection at the end of the gear train in the transfer case, the substitution of the shaft 120 or 140 allowing for conversion from a 6 x 6 drive to either a 4 x 4 drive or a 4 x 6 drive, respectively.

This is of great advantage in that only one pattern cost is involved in the transfer case, and three of the shafts remain identical for all three different types of drive. Thus, the transfer case of Figures 3 and 4 is possessed of great utility by reason of this conversion feature.

Considering now Figures 9 and 10 in detail, the form of the invention shown therein is a modification of the transfer case shown in Figures 3 and 4 in that the countershaft is directly geared to the input shaft of the transfer case, and in turn, drives both the rear axle output shaft and the front axle out-put shaft. By reason of this change, the power input shaft and each of the output shafts rotates in the same direction, which has been found desirable in certain situations. Similar reference numerals will be used to designate corresponding parts of this transfer case as compared to that shown in Figures 3 and 4.

The transfer case 14' of this form of the invention is adapted to be mounted in exactly the same position relative to the chassis as the transfer case 14 by means of the bosses 15 adapted to receive the studs 17 carried by the cross member. The power input shaft in this form of the invention corresponds exactly to the shaft 40 and has been given the same reference numeral. It carries the gear 35 rotatably journalled upon the reduced portion 34 thereof and the sliding clutch and gear 39 adapted to engage the clutch teeth of the gear 35 to clutch it to the shaft 40 are adapted to engage a second gear 150 keyed to the countershaft 152 for effecting the two-speed ratios. The shaft 152 also carries the gear 153 which is in constant meshing engagement with the gear 35, thus corresponding somewhat to the gears 46 and 52 of Figure 5. However, the shaft 152 of this form of the invention does not extend outwardly of the transfer case 14' but has its ends enclosed by the closure caps 154 and 155. The gear 153 is in constant meshing engagement with the gear 156 carried by the shaft 157 for driving the shaft 157, this shaft being extended rearwardly of the transfer case, as indicated at 158 for connection to the universal joint assembly 57 of the structure shown in Figure 1. The gear 153 is also in meshing engagement with the gear 160 carried by a shaft 162 corresponding to the shaft 73 of Figure 5, the shaft 162 extending rearwardly of the transfer case, as indicated at 163, for connection to a universal joint assembly corresponding to that indicated at 77 in Figure 1.

At its forward end the shaft 162 is reduced, as indicated at 164, to be journalled in the bearings 165 carried within the recessed end of a shaft 166 corresponding to the shaft 85 of Figure 5. Suitable clutch teeth 167 on the enlarged end of the shaft 166 are adapted to be engaged by the sliding clutch sleeve 168 for clutching the shaft 166 for conjoint rotation with the shaft 162. The shaft 166 has a reduced forwardly extending portion 169 adapted to be connected to a universal joint assembly, such as that indicated at 92 in Figure 1, for driving the front axle. It will be apparent that with this construction the same advantages are provided in that the drive to the conventional rear axle through the shaft 157 remains in the same plane as the power output shaft of the transmission, while the drive to the auxiliary rear axle assembly 22 and to the front axle assembly 20 is in a laterally offset plane through the shafts 162 and 166. Since both of the shafts 157 and 162 are driven from the same gear 153, it is apparent that they will both rotate in the same direction and will both rotate in the same direction as the shaft 40 of the transfer case, which is rotating in the direction of the rotation of the engine. This has been found to be desirable in certain instances.

Insofar as the controls for the transfer gearing in Figures 9 and 10 is concerned, they may be identical with that described in connection with Figures 3 to 6 in that one control is employed for selectively changing the gear ratio from the shaft 40 to the shaft 152, while another control is provided for clutching or declutching the front driving connection under the control of the operator.

It will be apparent that with this construction, substitution of shafts corresponding to the shafts 120 and 140 for the shafts 162 and 166 will result in converting the drive from a 6 x 6 drive to either a 4 x 4 drive or a 4 x 6 drive, respectively.

It will thus be apparent that the two transfer cases can be substituted one for the other and that either one has the characteristic of being modified to suit the type of drive desired without any material change in three of the four shafts carried thereby. Thus, a very economical design has been produced lending itself well to changes in types of drive without requiring a new transmission design, and which is capable of simplified manufacture and assembly.

As mentioned heretofore, the rear end of the input shaft 40 may be utilized as a power takeoff, in which case it is elongated as shown at 106 in Figure 5. It is obvious that the shaft 40 of Figure 10 may likewise be extended for this same purpose. With such a construction, the power takeoff is operative at all times, since the shaft 40 may receive engine torque without driving the vehicle, when gear 39 is in intermediate position. Thus the power takeoff can receive full engine torque when the vehicle is not moving, or that part of the engine torque not required to drive the vehicle when it is in motion.

When a 4 x 4 drive is employed, the power takeoff can be taken either from shaft 40, or from shaft 73 or shaft 47, depending upon which of these latter shafts is not connected to a driving axle. Similarly, in Figure 10, shafts 158 or 163 can likewise be connected to a power takeoff, depending upon whether a central or offset rear axle shaft is provided. The preferred position for the power takeoff, however, is on the rear end of the input shaft 40.

It will be noted that the housings 14 and 14' of Figures 5 and 10, respectively, are similar in appearance and include integrally connected end walls in which the shafts are rotatably journalled. Thus the bores for these shaft openings can all be cut at a single setting of the housing, insuring positive axial alinement of the opposed openings in the end walls of the housing. As a result, the bearing surfaces are formed in integrally connected end walls and registered accurately so that possibilities of misalinement are reduced to a minimum. The gears are assembled on the shafts by being passed through the opening over which control cap plate 45 is disposed, and the shafts are then passed through the housing bores to receive these gears. As a result, an easy assembly of the shafts and gearing is provided, and assembly of the bearings in the end walls of the housing for journalling the shafts is facilitated. The end bores may then be readily closed by cap members such as 50, 69, 70 and 103, when no power connection to the shaft is required. This construction therefore greatly reduces the cost of the structure while at the same time giving the advantage of proper alinement of the shafts and bearings in integrally connected end walls.

I am aware that various changes may be made in certain details of the present invention, and I therefore do not intend to be limited except as defined by the scope and spirit of the appended claims.

I claim:

1. An auxiliary transmission for a six wheel drive truck having one front and two rear driving axles, comprising transfer gearing mounted intermediate said front and rear axles and including an input shaft, a second shaft disposed below and substantially in the vertical plane of said input shaft, change speed gearing between said shafts for varying the driving ratio therebetween, and a third shaft means laterally offset from said second shaft and comprising axially alined shafts, selective clutch means therebetween, one of said last-named shafts being constantly driven by said second shaft, a driving connection between said second shaft and one of said rear axles, a driving connection between said one of said third axle shaft means and the other rear axle, and a driving connection between the other of said third shaft means and said front axle.

2. Transfer gearing for a vehicle having a conventional transmission and front and rear driving axles, comprising an input shaft connected to and substantially in alinement with the output shaft of said transmission, a second shaft extending parallel to and substantially in the same vertical plane as said input shaft therebelow, means disposed in said plane connecting said second shaft to said rear axle, means for driving said second shaft at selective speed ratios from said input shaft, a third shaft disposed substantially below said input shaft and in laterally offset parallel relation to said second shaft, means for driving said third shaft from said input shaft at substantially the same speed ratios as said second shaft and in the same direction, means connecting the forward end of said third shaft to said front axle, and drive transmitting means connected to the rear end of said third shaft.

3. The combination of claim 2 further characterized in the provision of clutch means on said third shaft interposed in said front axle connecting means.

4. Transfer gearing for a vehicle having a conventional transmission, a front driving axle and a pair of rear driving axles comprising an input shaft connected to and substantially in alinement with the output shaft of said transmission, a second shaft extending parallel to and substantially in the same vertical plane as said input shaft therebelow, means disposed in said plane connecting said second shaft to one of said rear axles, means for driving said second shaft at selected speed ratios from said input shaft, a third shaft disposed substantially below said input shaft and in laterally offset parallel relation to said second shaft, means for driving said third shaft from said input shaft at substantially the same speed ratios as said second shaft and in the same direction, means connecting said third shaft to said front axle, and means for driving said other rear axle from the rear of said third shaft.

5. In combination, a transmission housing, an input shaft therein having a gear rotatably journalled thereon, a splined clutch gear operable to clutch said gear to said shaft, a second shaft disposed below said input shaft in substantially the same vertical plane and having gear means thereon selectively driven through said first-named gear or said clutch gear, a third shaft laterally offset from said second shaft and having a gear thereon driven from one of said gear means of said second shaft, a fourth shaft laterally offset from said third shaft and driven thereby, a shaft axially alined with said fourth shaft and adapted to be clutched thereto, and output drive connections to corresponding ends of said second and fourth shafts and to the extending end of said axially alined shaft.

6. A transfer case for a multi-axle drive vehicle including an input shaft, a first power delivery shaft located substantially below and in the vertical plane of said input shaft, change speed gearing including a laterally offset countershaft between said input shaft and said first shaft, and a second power delivery shaft laterally offset from said countershaft away from said other shafts and driven from said countershaft conjointly with said first shaft.

7. A transfer case for a multi-axle drive vehicle including an input shaft, a first power delivery shaft located substantially below and in the vertical plane of said input shaft, change speed gearing including a laterally offset countershaft between said input shaft and said first shaft, and a second power delivery shaft laterally offset from said countershaft away from said other shafts and driven from said countershaft conjointly with said first shaft, said two power delivery shafts being spaced apart horizontally and being driven in the same direction at the same speed.

8. The combination of claim 6 further characterized in that said second power delivery shaft comprises two axially alined shaft sections, and clutch means therebetween.

9. The combination of claim 6 further characterized in that said second power delivery shaft comprises two axially alined shaft sections, one section being in constant driving engagement with said countershaft, and a clutch between said sections.

10. The combination of claim 6 further characterized in the provision of a brake drum carried by said first shaft externally of said case, and a brake band anchored on said case and operatively engageable with said drum.

11. The combination of claim 6 further characterized in the provision of a propeller shaft connected to the rear end of said first shaft, and propeller shafts connected to opposite ends of said second shaft.

12. The combination, with a vehicle having a transmission and a front and two rear driving axles, said rear rear axle having a propeller shaft axles, said rear axle having a propeller shaft connected thereto substantially in the longitudinal midplane of said vehicle, and said front axle and front rear axle having laterally offset propeller shafts extending toward each other and lying in the same vertical plane, of a transfer case disposed rearwardly of said transmission and having an input shaft connected to said transmission and lying in said midplane, a first power delivery shaft disposed below said input shaft in substantially the vertical plane thereof and connected to said rear axle propeller shaft, a second laterally offset power delivery shaft in said case connected at its forward end to said front axle propeller shaft and at its rear end to said front rear axle propeller shaft, and clutch means between said second shaft and said front axle propeller shaft.

13. The combination of claim 12 further characterized in the provision of change speed gearing between said input shaft and said power delivery shafts for varying the speed ratios therebetween.

14. The combination of claim 12 wherein said case includes a countershaft, change-speed gearing between said input shaft and countershaft, and means for driving both power delivery shafts rom a single gear on said countershaft.

15. The combination with a vehicle having a transmission and front and rear driving axles, said rear axle having a propeller shaft connected thereto substantially in the longitudinal midplane of said vehicle and said front axle having a laterally offset propeller shaft of a transfer case disposed rearwardly of the transmission and having an input shaft connected to said transmission and lying in said midplane, a first power delivery shaft disposed below said input shaft in substantially the vertical plane thereof and connected to said rear axle propeller shaft, a second laterally offset power delivery shaft in said case connected to said front axle propeller shaft, and a second rear driving axle having a propeller shaft extending substantially in alinement with said front axle propeller shaft and connected to said second power delivery shaft.

16. In a motor vehicle of the class wherein the power plant is supported by a frame, a pair of driving axles are spaced from each other longitudinally of said frame and operatively connected thereto, and a propeller shaft is connected to each of said axles and extends therefrom toward the other of said axles, the combination with said propeller shafts and power plant of means for driving the former from the latter comprising a gear box, a first gear in said box connected to said power plant, a second gear in said box meshing with said first gear, the axes of said first and second gears being parallel and displaced one above the other, and a third and a fourth gear in said box arranged with their axes parallel and spaced transversely of the vehicle from one another and below the axis of said first gear, one of said third and fourth gears meshing with said second gear and the other of said third and fourth gears receiving its driving movement through said second gear, one of the last-mentioned pair of gears being connected to one of said propeller shafts and the other of said last-mentioned pair of gears being connected to the other of said propeller shafts.

17. In a motor vehicle of the class wherein the power plant is supported by a frame, a pair of driving axles are spaced from each other longitudinally of said frame and operatively connected thereto, and a propeller shaft is connected to each of said axles and extends therefrom toward the other of said axles, the combination with said propeller shafts and power plant of means for transmitting driving movement therebetween comprising a gear box, a first gear in said box above the normal plane of said axles and connected to said power plant for receiving driving movement therefrom, a second gear in said box meshing with said first gear for receiving driving movement therefrom, the axes of said first and second gears being parallel and displaced one above the other, and a pair of gears in said box positioned with their axes transversely spaced and a material distance below the axis of the first-mentioned gear, one of said pair of gears meshing with said second gear and the other of said pair receiving its driving movement from said second gear, one of said pair of gears being connected to one of said propeller shafts and the other of said pair of gears being connected to the other of said propeller shafts.

18. In a motor vehicle of the class wherein the power plant is supported by a frame, a pair of driving axles are spaced from each other longitudinally of said frame and operatively connected thereto, and a propeller shaft is connected to each of said axles and extends therefrom toward the other of said axles, the combination with said propeller shafts and power plant of means drivingly interconnecting them comprising a gear box, a first gear in the upper portion of said box operatively connected with said power plant, a second gear in said box in mesh with said first gear and disposed with its axis laterally and downwardly offset therefrom and parallel thereto, a third gear in said box in mesh with said second gear and disposed with its axis in laterally offset and downwardly spaced relation with respect to said second gear, a fourth gear in said box at substantially the same level as said third gear and in meshing relationship with respect to said second gear and disposed with its axis offset from the axis of said second gear and on the side thereof opposite said third gear and arranged with its axis below the axis of said second gear, said third gear being operatively connected with one of said propeller shafts and said fourth gear being connected with the other of said propeller shafts.

19. In a motor vehicle of the class wherein the power plant is supported by a frame, a pair of driving axles are spaced from each other longitudinally of said frame and operatively connected thereto, and a propeller shaft is connected to each of said axles and extends therefrom toward the other of said axles, the combination with said propeller shafts and power plant of means drivingly interconnecting them comprising a gear box intermediate said axles, a rotatable shaft in the upper portion of said box operatively connected with said power plant, a second rotatable shaft in said box disposed with its axis in parallel and downwardly offset relation from the first-mentioned shaft, first and second intermeshing gears interconnecting the first-mentioned shaft and said second shaft, a third and a fourth rotatable shaft in said gear box laterally spaced from one another below the axis of said second shaft and with the axis of said third shaft disposed approximately in the same vertical plane including the axis of said first shaft, a third gear on said third shaft, a fourth gear on said fourth shaft, one of said third and fourth gears meshing with the gear on said second shaft and the other of said third and fourth gears receiving its driving movement through the gear on the second shaft, said third shaft being connected with the propeller shaft connected with the rearmost of said axles and said fourth shaft being connected with the propeller shaft for the foremost of said axles.

20. In a motor vehicle of the class wherein the power plant is supported by a frame, a pair of driving axles are spaced from each other longitudinally of said frame and operatively connected thereto, and a propeller shaft is connected to each of said axles and extends therefrom toward the other of said axles, the combination with said propeller shafts and power plant of means drivingly interconnecting them comprising a gear box intermediate said axles, a shaft rotatably mounted in the upper portion of said gear box operatively connected to said power plant, a second shaft rotatably mounted in said gear box parallel to and below the first-mentioned shaft, two pairs of gears operable to drivingly interconnect said first-mentioned shaft with said second shaft, means selectively operable to render either one of said pair of gears effective in transmitting power between said shafts to the exclusion of the other of said pair, a third shaft rotatably mounted in said gear box below the axis of said second shaft and in approximate vertical alignment with the axis of the first-mentioned shaft, a fourth shaft rotatably mounted in said gear box in approximately the same horizontal plane as said third shaft but laterally offset therefrom, means for causing simultaneous rotation of said third shaft and said second shaft at all times, selectively operable means for effecting driving movement of said fourth shaft from said second shaft, said third shaft being connected with the propeller shaft connected with the rearmost of said axles and said fourth shaft being operatively connected to the propeller shaft connected with the foremost of said axles.

LEO A. BIXBY.